(12) United States Patent
Kumar et al.

(10) Patent No.: US 7,342,057 B2
(45) Date of Patent: *Mar. 11, 2008

(54) SELF-HEALING COATINGS USING MICROCAPSULES TO SUPPRESS LEAD DUST

(75) Inventors: Ashok Kumar, Champaign, IL (US); Larry D. Stephenson, Champaign, IL (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/923,890

(22) Filed: Aug. 24, 2004

(65) Prior Publication Data

US 2006/0042504 A1 Mar. 2, 2006

(51) Int. Cl.
*C08J 3/00* (2006.01)
*C08K 9/00* (2006.01)
*C08L 75/00* (2006.01)
*C08G 18/80* (2006.01)
*B32B 5/16* (2006.01)

(52) U.S. Cl. .................. 523/200; 427/213; 428/402.21; 523/202; 523/205; 524/86; 524/91; 524/137; 524/211; 524/543; 524/589; 524/590; 524/591; 524/599; 524/612; 524/839; 524/840

(58) Field of Classification Search .............. 427/213; 428/402.21; 524/86, 91, 137, 211, 543, 589, 524/590, 591, 839, 840, 599, 612; 523/200, 523/202, 205

See application file for complete search history.

(56) References Cited

U.S. PATENT DOCUMENTS

| | | | |
|---|---|---|---|
| 5,575,841 A | 11/1996 | Dry | |
| 5,660,624 A | 8/1997 | Dry | |
| 5,989,334 A | 11/1999 | Dry | |
| 6,060,152 A | 5/2000 | Murchie | |
| 6,075,072 A | 6/2000 | Guilbert et al. | |
| 6,261,360 B1 | 7/2001 | Dry | |
| 6,746,522 B2 | 6/2004 | Trippe et al. | |
| 7,192,993 B1 * | 3/2007 | Sarangapani et al. | 523/200 |

OTHER PUBLICATIONS

U.S. Appl. No. 10/377,642, Kumar.

* cited by examiner

*Primary Examiner*—Patrick Niland
(74) *Attorney, Agent, or Firm*—Earl H. Baugher, Jr.

(57) ABSTRACT

Self-healing coatings incorporate microcapsules of about 60-150 microns diameter that contain film formers and dust suppression compounds suitable for controlling spalling of lead dust, for example. In one embodiment, a primer paint is mixed with these microcapsules and applied by brushing or rolling. After the coating has cured, any physical compromise of the coating results in microcapsules bursting to release liquid that fills and seals the compromised volume. The microcapsule contents protect the underlying substrate from damage and repair some of the outer coating. In one application, embodiments of these self-healing coatings seal existing lead-based paint for suppression of lead dust. In another embodiment, microcapsules are provided separately to enhance commercially available products. For example, if a paint formulation is known a priori, specifically configured microcapsules, packaged separately from the paint and designed for use with the paint formulation, are added to the paint just prior to application.

26 Claims, 4 Drawing Sheets

SELF-HEALING COATINGS USING MICROCAPSULES TO SUPPRESS LEAD DUST

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein. This and related patents are available for licensing. Please contact either Bea Shahin at 217 373-7234 or Phil Stewart at 601 634-4113.

RELATED APPLICATIONS

Claims directed to self-healing coatings have earlier issued to the present assignee in U.S. Pat. No. 7,192,993, necessitating the instant patent to be subject to a terminal disclaimer.

BACKGROUND

Lead-based paint was commonly used for residential, government and commercial buildings constructed prior to 1978. Damaged or aged lead-based paint coatings are sources of hazardous lead dust. Lead dust may remain on the damaged coating surfaces or become an airborne particulate hazard as the peeling paint spalls off, or falls into nearby soil. Deteriorated lead-based coatings poses a serious health risk to building occupants, particularly children. Abatement reduces or removes the health risk and includes removal, encasement, and over-coating with encapsulating coatings. Removal includes removal of the lead painted substrate or removal of the lead-based paint itself. However, removal is generally reserved for limited surface area and for surfaces where historic preservation requirements may apply. Lead paint removal techniques require high levels of control and worker protection, and also may generate significant amounts of hazardous waste.

The efficacy of a "self-healing" corrosion inhibiting coating system for use on outdoor steel cabinet enclosures for electrical equipment has been investigated. Kumar, A. and Stephenson, L. D., *Accelerated Testing of Self healing Coatings*, Corrosion 2003, Proceedings, National Association of Corrosion Engineers Conference, San Diego, Calif., 2003. Kumar, A and Stephenson, L. D., *Self healing Coatings*, Corrosion 2002, Proceedings, National Association of Corrosion Engineers Conference, Denver, Colo., 2002. U.S. patent application Ser. No. 10/377,642, Self-Healing Coating and Microcapsules to Make Same, by Kumar filed Mar. 4, 2003 and U.S. Pat. No. 7,192,993, Self-Healing Coating and Microcapsules to Make Same, to Sarangapani et al., Mar. 20, 2007, are incorporated herein by reference. Based on successful applications described therein, similar coatings were developed for over-coating wood substrates that had previously been coated with lead-based paint.

There have been efforts to effect a self-repairing capability in various materials, notably shaped articles that may be made of materials with a weakness in one or more orientations, such as cementitious materials having inherently poor tensile strength. U.S. Pat. No. 5,575,841, Cementitious Materials, to Dry, Nov. 19, 1996, and U.S. Pat. No. 5,660,624 (Aug. 26, 1997), U.S. Pat. No. 5,989,334 (Nov. 23, 1999), and U.S. Pat. No. 6,261,360 B1 (Jul. 17, 2001), each entitled Self-Repairing Reinforced Matrix Materials, all to Dry, detail a method of incorporating hollow fibers in "pourable" material to effect a self-repairing function. These inventions employ selectively releasable compounds within the hollow fiber. Because of the size of the fibers, these patents are unsuitable for repair upon a smooth surface.

Microcapsules contain minute amounts of product for specialized delivery, often size, time or location critical. They may be obtained in diameters of less than 250 microns ($\mu$) and have been used in a variety of applications, from the pharmaceutical industry (delivery of drugs) to the textile industry (providing protective wear for HAZMAT workers). One example is U.S. Pat. No. 6,060,152, Fabric with Microencapsulated Breach Indication Coating, to Murchie, May 9, 2000. The '152 patent describes a membrane incorporating a number of different microcapsules that alert to even the smallest compromise of the fabric comprising a protective suit such as may be worn by a HAZMAT worker or health professional.

Very recent work to improve coatings by the addition of additives involves only improving the application of the coating to a substrate, not the ability of the coating to "repair" itself upon its compromise. One such example is U.S. Pat. No. 6,746,522 B2, High Molecular Weight Polymer Additive for Coating and Protective Products, to Trippe et al., Jun. 6, 2004. The '522 patent details the advantages of adding small amounts of an ultrahigh molecular weight polymer, such as polyisobutylene, to enhance coating properties of a solvent. Once, a nick compromises the coating or it is abraded, however, another separately applied application is required to protect the substrate.

Another concern in using microcapsules with solvents is the timing of delivery of the encapsulated compound. Prior patents have avoided this timing problem by mixing the microcapsules with dry powder coatings such as are used in "powder coating" applications involving elevated temperatures. U.S. Pat. No. 6,075,072, Latent Coating for Metal Surface Repair, to Guilbert et al., Jun. 13, 2000, details a self-repairing compound suitable for use in powder coating. By adding microcapsules of sufficiently small size, i.e., 10-40$\mu$, to a dry powder form of protective coating, the resultant "self-repairing" coating is able to be powder coated upon metal substrates at suitable elevated temperatures that melt the coating to a homogenous continuous surface of approximately 200$\mu$ thickness. The microcapsules used with the '072 patent are mixed with a solvent in the dry state to prevent short-term degradation of the shells by liquid solvents.

For paint systems, self-healing coatings are fabricated by adding microcapsules containing at least one "self-healing" compound to commercially available paint primers. Paint primers may include those paints commercially termed "one coat" or "self-priming." The microcapsules release the self-healing compound or compounds, most commonly as liquids, when the coating system is damaged. Urea formaldehyde (UF) microcapsules of 50-150 $\mu$ in diameter have been added to primers with an applied thickness of 0.1 mm (0.004") to increase the coating service life by "self-healing" damaged areas. Verification of performance was conducted by accelerated corrosion testing on conventional coating systems using ASTM D 5894 and Electrochemical Impedance Spectroscopy (EIS). M. Kendig and J. Scully, *Basic Aspects of Electrochemical Impedance Applications for the Life Prediction of Organic Coatings on Metals, Corrosion*, Vol. 46, No.1, pp. 22-29, 1990. H. Hack and J. Scully, *Defect Area Determination of Organic Coated Steels in Seawater Using the Breakpoint Frequency Method, J. Electrochem. Soc.*, Vol. 138, No. 1, pp. 33-40, 1991.

Unless appropriate materials are used to fabricate the microcapsule and its contents, it may "deploy" before the coating is applied or, upon application, spontaneously deploy improperly, i.e., without a physical compromise of the coating such as abrasion or nicking. Further, unless the microcapsule is compatible with both its contents (the encapsulated repair compound) and its surrounds (the solvent), the "application" life of the resultant mixed product may be less than desirable. These constraints have been addressed in the present invention.

Over-coating lead-based paint is one relatively inexpensive method of in situ lead hazard control. However, if over-coatings are damaged, lead dust may be exposed. A method of sealing damaged regions of the over-coating itself is needed to suppress dispersion of lead dust.

DETAILED DESCRIPTION

A self-healing coating suitable for suppression of dust from an undercoating comprises: one or more liquid solvents; one or more solids dispersed in the solvent and microcapsules; containing one or more repair substances suitable for suppression of dust from an undercoating to the self-healing coating. The shell of the microcapsule is resistant to degradation by the repair substance. Prior to application of the self-healing coating and after addition of the microcapsules to the liquid solvent/solid mixture, the microcapsules are resistant to short term degradation by either the liquid solvent or the solids.

The microcapsules burst upon physical compromise of the applied and cured self-healing coating, releasing the repair substance to fill and seal the compromised volume within the self-healing coating. The self-healing coating, even without the microcapsules, comprises a protective coating, such as a paint. The paint may be a primer selected from the group consisting of: polyurethanes, oil-based enamels, enamel undercoaters, latex acrylics, acrylic formulations and epoxy formulations.

In select embodiments of the present invention, the self-healing coating may further comprise a topcoat paint selected from the group consisting of: polyurethanes, oil-based enamels, enamels, latex acrylics, acrylic formulations and epoxy formulations.

In select embodiments of the present invention, the self-healing coating may be a self-priming paint selected from the group consisting of: polyurethanes, oil-based enamels, enamels, latex acrylics, acrylic formulations and epoxy formulations.

In select embodiments of the present invention, the self-healing coating may include the combination of one or more liquid solvents and one or more solids. In select embodiments of the present invention, the self-healing coating including one or more liquid solvents and one or more solids may be a decorative coating.

In select embodiments of the present invention, the self-healing coating may employ microcapsules having a spherical shell with an outer diameter within the approximate range of 50 to 200 microns and preferably an outer diameter within the approximate range of 60 to 150 microns.

In select embodiments of the present invention, the shell comprises urea formaldehyde (UF). In select embodiments of the present invention, the shell comprises gelatin.

In select embodiments of the present invention, the repair substance comprises materials selected from the group consisting essentially of: film-forming compounds, dust suppression compounds, diluents, and combinations thereof. In select embodiments of the present invention, the film-forming compounds are selected from the group consisting essentially of polybutene, $Ca(OH)_2$, and combinations thereof. In select embodiments of the present invention, the diluents are selected from the group consisting essentially of: long chain polyester diluents, carrier diluents, water, and combinations thereof. In select embodiments of the present invention, the dust suppression compounds are selected from the group consisting essentially of: $Ca(OH)_2$, polybutene, and combinations thereof.

In select embodiments of the present invention, the microcapsules are added as a pre-specified percentage of the weight of the solids and liquids comprising a non-self healing coating. The microcapsules are added at a pre-specified time prior to application of the self-healing coating. In select embodiments of the present invention, the pre-specified percentage lies in the approximate range of 10 to 40% and the pre-specified time is within about fourteen (14) days prior to application of the self-healing coating. In select embodiments of the present invention, the pre-specified percentage is preferably approximately 20% and the pre-specified time is approximately concurrent with preparing the self-healing coating for application.

Select embodiments of the present invention comprise microcapsules suitable for adding to a liquid protective coating to be cured at ambient temperature to facilitate self-healing of the resultant coating after curing thereof. The self-healing further suppresses dust dispersion from an existing undercoating. The microcapsules comprise a repair substance suitable for suppressing of dust dispersion and a shell enclosing a volume containing the repair substance. Upon application of the resultant self-healing coating to a substrate and curing of the self-healing coating thereon, physical compromise of the self-healing coating results in rupture of the shell and deployment of the repair substance to fill and seal the compromised volume within the self-healing coating adjacent to the burst microcapsules.

In select embodiments of the present invention, the microcapsule shell is a sphere with an outer diameter within the approximate range of 50 to 200 microns and preferably with an outer diameter within the approximate range of 60 to 150 microns. In select embodiments of the present invention, the shell comprises gelatin. In select embodiments of the present invention, the shell preferably comprises urea formaldehyde (UF).

In select embodiments of the present invention, the repair substance comprises materials selected from the group consisting essentially of: film-forming compounds, dust suppression compounds, diluents, and combinations thereof. In select embodiments of the present invention, preferably the film-forming compounds are selected from the group consisting essentially of: polybutene, $Ca(OH)_2$, and combinations thereof.

In select embodiments of the present invention, the diluents are selected from the group consisting essentially of: long chain polyester diluents, carrier diluents, water, and combinations thereof. In select embodiments of the present invention, the dust suppression compounds are selected from the group consisting essentially of: $Ca(OH)_2$, polybutene, and combinations thereof.

Further, select embodiments of the present invention include a method for composing a liquid self-healing coating that repairs itself after application and curing while suppressing at least some dust from an underlying coating upon compromise of the self-healing coating. The method comprises:
  providing a liquid non-self healing coating;
  providing microcapsules filled with at least one repair substance compatible with the non-self healing coating and suitable for suppressing of dust from an existing coating to be covered by the self-healing coating; and
  at a pre-specified time prior to applying the liquid self-healing coating, mixing the microcapsules into the liquid non-self healing coating such that the microcapsules are fully wetted and interspersed evenly throughout the liquid non-self healing coating.

Further, select embodiments of the present invention include a method for producing a self-healing coating upon a substrate having an existing coating, the self-healing coating suitable for suppressing at least some dust from the existing coating upon compromise of the self-healing coating. The method comprises:
  providing a liquid non-self healing coating;
  providing microcapsules filled with a repair substance compatible with the non-self healing coating and suitable for suppressing of dust;
  at a pre-specified time prior to applying a resultant self-healing coating, mixing the microcapsules into the liquid non-self healing coating such that the microcapsules are fully wetted and interspersed evenly throughout the liquid non-self healing coating;
  applying the liquid self-healing coating to the substrate by any of a number of means selected from the group consisting of: brushing, rolling, drawing down, and combinations thereof; and
  permitting the applied self-healing coating to cure prior to use of the substrate.

Select embodiments of the present invention yield a "smart" coating system that has "self-healing" properties based on one or more specifically selected components comprising a viscous liquid compound contained in microcapsules and inserted into a pre-specified coating, such as a commercially available latex paint. In one application, it may be employed to cover and seal existing cured lead-based paint to suppress hazardous lead dust. In a preferred embodiment of the present invention, urea formaldehyde microcapsules, approximately 60-150 microns ($\mu$) in diameter, containing film-forming compounds or "healants," are mixed with commercially available coatings, such as acrylic latex paints. When the applied and cured modified coating of the present invention is damaged, e.g., by abrasion or cutting through the coating to the substrate on which it is applied, the microcapsules burst, releasing the film forming compounds. This initiates a self-healing process, i.e., the damaged area of the substrate is covered and repaired, inhibiting the dispersion of underlying material, such as lead dust.

Microcapsules used with embodiments of the present invention may be manufactured for addition to various paint or other coating formulations. One or more types of these film-forming and lead-dust suppression microcapsules may be used in coating (e.g., paint) systems to minimize the damage caused by scratches or abrasions to these systems. This is accomplished by the release of specially formulated chemicals that flow into the damaged areas and form thin films that "re-seal" the outer coating.

Laboratory experiments determined the effectiveness of different types of microcapsules used to make self-healing coatings that could suppress lead dust from underlying coatings. The four types of microcapsules tested contained core ingredients of polybutene/sanitizer ("poly"), calcium hydroxide (CaOH), tung oil, and a mixture of tung oil and spar varnish. All microcapsules 104 had urea formaldehyde shells (not shown separately) with diameters of approximately 63 to 150$\mu$.

Cured samples were tested three ways: visually, using a "Lead-Check" swab, and wiping for lead dust concentration levels in accordance with the ASTM E 1728-95 standard, *Standard Practice for Field Collection of Settled Dust Samples Using Wipe Sampling Methods for Lead Determination by Atomic Spectrometry Techniques*, American Society for Testing Materials, West Conshohocken, Pa., (2001).

The optimum size for microcapsules that perform these functions was found to be in the range of approximately 60-150$\mu$ diameter. Large microcapsules (100-150$\mu$) provide a better delivery system for their functional constituents; however, the microcapsules should not be larger than the dried protective coating (paint film) thickness in which they are entrained. For investigating select embodiments of the present invention, microcapsules were mixed into a primer coat, applied and allowed to dry. A topcoat layer without microcapsules was then applied and tests run on the resultant finish.

Observations were made and numerical results obtained for the amount of lead dust exposed when protective coatings containing various types of microcapsules were breached. The paint used in all experiments was a commercially available enamel gloss acrylic latex used for trim. In all experiments, microcapsules were mixed with the paint at a weight percentage ratio of 20% microcapsules to 80% paint.

Applying these protective coatings using a pneumatic air spray gun, broke the microcapsules upon impact. Therefore, two alternative application methods were first used: drawdown and spray-applying a primer coat in two layers, with microcapsules manually applied (dusted on) between the layers.

In order to simulate the effects of damaged "protective" coatings and evaluate the efficacy of the lead dust suppression/self-healing microcapsules, razor blade cuts were made in the cured protective coatings to simulate damage to the coating, and to break the microcapsules containing the film-formers and lead dust suppression compounds.

Figure 1:
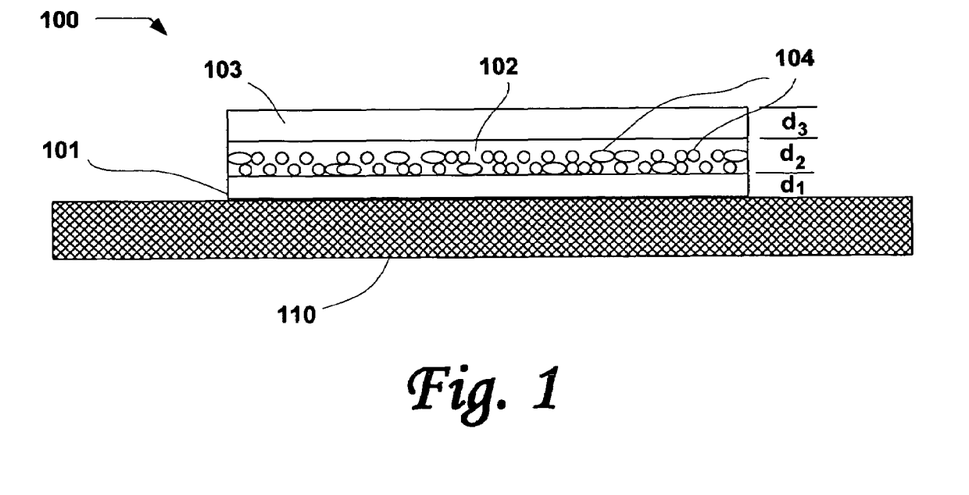
FIG. 1 is an edge view of a typical test setup used to verify efficacy of preferred embodiments of the present invention.

Refer to FIG. 1, a schematic illustrating the various layers of coatings (paint and paint with microcapsules 104) in the protective coating samples 100. All microcapsules 104 were mixed with a primer version of an acrylic latex paint and applied at a thickness, $d_2$=150-200μ, over a coat of lead-based paint of thickness, $d_1$=100μ.

All of the samples 100 were then covered with a layer 103 of gloss acrylic latex paint at a thickness, $d_3$=100-200μ. After allowing the finish coat 103 to cure, the samples 100 were scribed with a razor blade. When cut or scratched, the paint coatings 101, 102, 103 are compromised and some of the microcapsules 104 burst. The rupture of the microcapsules 104 is sufficient to release their "payloads." The payload, i.e., core material, is free to flow into the void created by the cut. The contents of the microcapsules 104 form a protective barrier, sealing any lead dust therein. The dried samples were "compromised" (cut) and evaluated using three methods: visual observation, swabbed with a "Lead-Check" swab, and wiped for laboratory determination of "emitted" lead dust concentration levels using ASTM E 1728-95.

Wood substrates 110, 17.5 cm (7 in.)×6.25 cm (2.5 in.)×0.5 cm (0.2 in.), were coated with a first coat 101 of lead-based paint at an approximate thickness, $d_1$=100μ, over an area of 7.5 cm (3 in.)×6.25 cm (2.5 in.). The paint on these substrates 110 was allowed to fully cure for two weeks. Afterwards, a primer "protective" coat 102 of latex primer and microcapsules 104 was applied at $d_2$=150-200μ wet film thickness using a drawdown device. For all control samples (not shown separately), a primer layer was composed of only primer latex paint of the same type used for entraining the microcapsules 104.

For all samples 100 containing microcapsules 104, this layer 102 contained a mixture of 20% microcapsules 104 and 80% latex paint by weight. Four types of microcapsules 104, each type incorporating one of the four different variations of separate core material, were hand mixed by gently stirring each with a spoon into the same type of latex paint. This yielded four separate "protective microcapsule coatings" for testing. Each of the protective coatings had only one of the four types of microcapsules entrained therein. The resultant latex paint layers 102 incorporating microcapsules 104 were allowed to dry on each sample 100 for 24 hours before applying a finish acrylic latex paint 103 of thickness, d=150-200μ. This finish coat 103 was also applied on control samples. For each set of data, nine samples 100 were made for each type of microcapsule 104 and nine control samples were made. The samples 100 were compared to establish the efficacy of adding each separate type of microcapsule 104. Test results on only those types of microcapsules 104 exhibiting a beneficial result were reported. Thus, microcapsules containing tung oil or a mixture of tung oil and varnish, having tested as being ineffective, are not reported herein.

Figure 2:
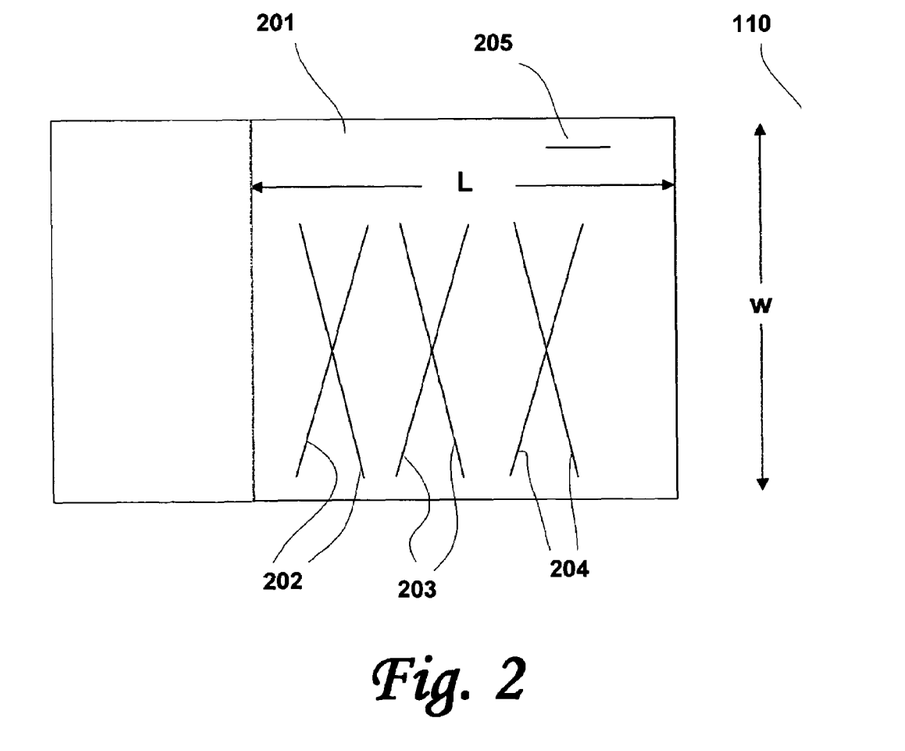
FIG. 2 is a top view of the test setup of FIG. 1 depicting a first procedure used to verify efficacy of preferred embodiments of the present invention.

Refer to FIG. 2. A sample 100 incorporating one type of added microcapsule 104 of sizes varying in the range of approximately 60-150μ comprises a painted surface 201 of approximately 7.6 cm (3 in.) length, L, by 6.4 cm (2.5 in) width, W, on the wood surface 110. Once each sample 100 was cured, some were selected to be tested visually.

Figure 3:
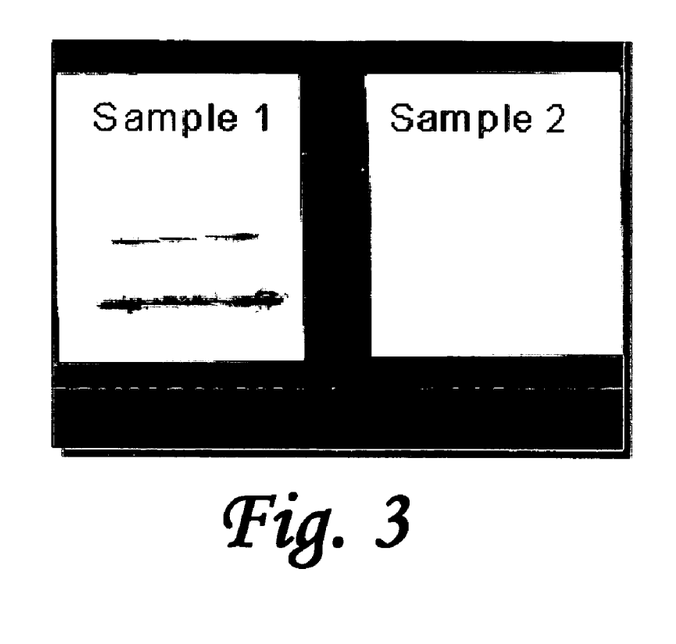
FIG. 3 is a micrograph comparing the self-healing characteristics of an embodiment of the present invention to a control sample not employing microcapsules of the present invention.

The following procedure was used for a first screening process. Three identical X's were carefully cut in each sample 100 with a razor blade. Each cut 202, 203, 204 was exactly 3.8 cm (1.5 in.) long, and deep enough to penetrate completely through all of the paint layers 101, 102, 103. Each sample 100 was examined carefully under a microscope to visually confirm that at least some microcapsules 104 were broken. A Lead-Check swab (not shown separately) was used to determine if lead dust (not shown separately) was getting through the cuts 202, 203, 204. These swabs turn pink when they encounter lead at as low as 5000 ppm or 10 μg Pb/ft$^2$. For example, see FIG. 3 in which Sample 1, with dark streaks indicates the presence of lead and Sample 2, with light streaks, does not.

A first X-cut (e.g., as at cuts 202) was swabbed immediately after being cut. A second X-cut (e.g., as at cuts 203) was tested ten minutes after being cut. A third X-cut (e.g., as at cuts 204) was tested three hours after being cut. An additional single cut 205, of a nominal width of 1.25 cm (0.5 in), was made in each sample 100 and swabbed after two days. The separate time intervals were used to determine how quickly the microcapsule film-formers became effective, and to observe how their performance changed over time. If "cut" samples 100 of the microcapsule-laden layers (coatings) 102 indicated decreased levels of lead dust compared to the "cut" control samples, these microcapsule-laden samples 100 were selected for the next level of testing, quantification of lead dust present. Thus only the $Ca(OH)_2$, polybutene ("poly"), and a 50:50 mixture (within each microcapsule 104) of $Ca(OH)_2$ and polybutene were further investigated.

Figure 4:
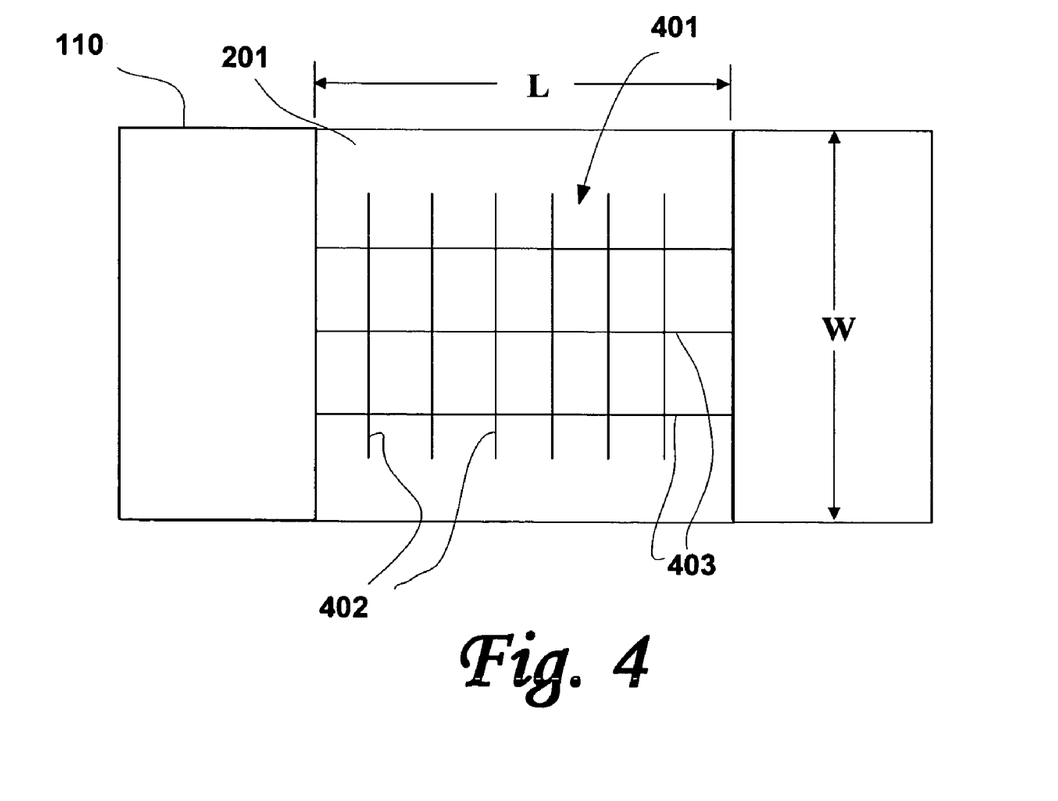
FIG. 4 is a top view of the test setup of FIG. 1 depicting a second procedure used to verify efficacy of preferred embodiments of the present invention.

Refer to FIG. 4 depicting a "cross-hatched" cut configuration 401 on sample painted surfaces 201 of a substrate 110 like that of FIGS. 1 and 2. To further quantify the lead dust concentration levels, a wipe test was performed on each of the vertical 402 and horizontal 403 cuts in the configuration 401. Six 3.8-cm (1.5 in.) "vertical" incisions 402 were made on a sample 100 using a razor blade. Next, three 7.6-cm (3 in.) horizontal cuts 403 were made across the vertical cuts 402. Each sample 100 was wiped according to ASTM E 1728-95 using standard pre-packaged paper towelettes soaked in a wetting agent. The wipe samples (not shown separately) were then placed into 50 ml disposable test tubes and shipped to an analytical laboratory that used flame atomic absorption spectroscopy of the NIOSH 7082 standard for lead detection. This method detects lead levels to a sensitivity of 2.5 μg/sample.

After reviewing experimental results and selecting those coating embodiments yielding significant lead dust suppression, coating application procedures were investigated. Although a drawdown device is useful for making small coating samples in the laboratory, it is not practical for applying these coatings to large areas. Therefore, three types of application methods were tested: spraying, rolling, and brushing.

In all cases investigating application methods, the microcapsules 104 were mixed in the same method as in the above laboratory experiments, i.e., hand mixed at a 20/80 weight-ratio of microcapsules 104 to paint. Initially in laboratory experiments, a wet primer or topcoat formulation was premixed with microcapsules 104 and applied using a pneumatic air spray gun (not shown separately), however the microcapsules 104 broke upon impact. Also, the microcapsules 104 clogged the spray gun. Therefore, alternative application methods were used in the laboratory: drawdown and air spraying the primer coat in two layers (not shown separately), with the microcapsules 104 being manually dusted on between the layers to form the primer layer 102 of the microcapsule samples 100. After curing for two weeks, these samples were scribed as described above.

For non-laboratory application, both rolling and brushing proved effective. The microcapsules 104 were well dispersed in both cases. The brushing technique yielded a slightly smoother surface, but still left small ridges (not shown separately) throughout the coating surface. In a few cases in which microcapsule-containing coatings 102 were rolled on, some clumping of microcapsules 104 was observed. A single application using either of these two techniques yielded a paint/microcapsule layer 102 that was too thin; i.e., with $d_2=75\mu$, the "primer coating" layer 102 was not providing enough protection against dispersion of lead dust. To rectify this, two primer coating layers 102 (microcapsules/paint mixture) were applied by either brushing or rolling so that $d_2=150\mu$.

Tables 1 thru 7 show the results of the ASTM E 1728-95 lead wipe tests on six paint samples 100 and six controls in each set as applied by drawdown and brush. The microcapsules 104 that were most effective against lead dust were the $Ca(OH)_2$ microcapsules 104 with the polybutene microcapsules 104 coming in second. The tung-oil and tung oil-varnish mixture microcapsules 104 provided the least amount of protection against lead dust and, as such, are not reported as a viable alternative.

Although the $Ca(OH)_2$ microcapsules 104 did not perform as well immediately after the cuts were made, the $Ca(OH)_2$ microcapsules 104 outperformed all other types at the ten-minute and three-hour marks. Ideally, the $Ca(OH)_2$ released from the microcapsules 104 reacts with moisture and $CO_2$ in the air to form calcium carbonate (not shown separately), a hard, durable substance. The calcium carbonate then acts as a barrier to prevent lead dust from escaping. This process takes about 15 minutes to occur, and this fact may contribute to reduced performance immediately after the cut is made.

Tables 1 and 2 show performance of the six "swabbed" $Ca(OH)_2$ microcapsule (μcapsule) samples 100 against six control samples when applied using the draw down technique (33% lead dust suppression) for first and second sample sets, respectively.

TABLE 1

ASTM E 1728-95 RESULTS FROM SAMPLE SET 1: $Ca(OH)_2$ MICROCAPSULES APPLIED WITH A DRAW DOWN DEVICE
Set 1

| CODE | μcapsule Type | Pb level |
|---|---|---|
| B1 | $Ca(OH)_2$ 1 | 18 |
| B2 | $Ca(OH)_2$ 2 | 14 |
| B3 | $Ca(OH)_2$ 3 | 16 |
| B4 | $Ca(OH)_2$ 4 | 13 |
| B5 | $Ca(OH)_2$ 5 | 30 |
| B6 | $Ca(OH)_2$ 6 | 36 |
| | AVG = | 21.16667 |
| | Stan. Dev. | 9.516652 |
| C1 | Control-1 | 25 |
| C2 | Control-2 | 39 |
| C3 | Control-3 | 40 |
| C4 | Control-4 | 19 |
| C5 | Control-5 | 24 |
| C6 | Control-6 | 43 |
| | AVG = | 31.66667 |
| | Stan. Dev. | 10.15218 |

TABLE 2

ASTM E 1728-95 RESULTS FROM SAMPLE SET 2: $Ca(OH)_2$ MICROCAPSULES APPLIED WITH A DRAW DOWN DEVICE
Set 2

| CODE | μcapsule Type | Pb level |
|---|---|---|
| Bb1 | $Ca(OH)_2$ 1a | 31 |
| Bb2 | $Ca(OH)_2$ 2a | 25 |
| Bb3 | $Ca(OH)_2$ 3a | 17 |
| Bb4 | $Ca(OH)_2$ 4a | 12 |
| Bb5 | $Ca(OH)_2$ 5a | 19 |
| Bb6 | $Ca(OH)_2$ 6a | 24 |
| | AVG = | 21.33333 |
| | Stan. Dev. | 6.713171 |
| C1 | Control-1 | 34 |
| C2 | Control-2 | 42 |
| C3 | Control-3 | 21 |
| C4 | Control-4 | 35 |
| C5 | Control-5 | 34 |
| C6 | Control-6 | 29 |
| | AVG = | 32.5 |
| | Stan. Dev. | 7.007139 |

Table 3 shows the performance of six samples of $Ca(OH)_2$ microcapsules 104 compared to six control samples, all applied with a brush (94% lead dust suppression).

TABLE 3

ASTM E 1728-95 RESULTS FROM $Ca(OH)_2$ MICROCAPSULES APPLIED WITH A BRUSH

| CODE | μcapsule Type | Pb level |
|---|---|---|
| Da1 | $Ca(OH)_2$ 1a | 2.5 |
| Da2 | $Ca(OH)_2$ 2a | 2.5 |
| Da3 | $Ca(OH)_2$ 3a | 2.5 |
| Da4 | $Ca(OH)_2$ 4a | 2.5 |
| Da5 | $Ca(OH)_2$ 5a | 10.5 |
| Da6 | $Ca(OH)_2$ 6a | 2.5 |
| | AVG = | 3.833333 |
| | Stan. Dev. | 6.667 |
| Ca1 | Control 1a | 5.5 |
| Ca2 | Control 2a | 49 |
| Ca3 | Control 3a | 25 |
| Ca4 | Control 4a | 199 |
| Ca5 | Control 5a | 42 |
| Ca6 | Control 6a | 93 |
| | AVG = | 68.91667 |
| | Stan. Dev. | 130.0833 |

The polybutene microcapsules 104 were also efficient in lead suppression. They proved to be very effective in preventing most of the lead dust from reaching the surface. They were the most effective microcapsules immediately after the layers 101, 102, 103 were cut. Since polybutene has a relatively low viscosity, it filled in the cuts quickly. Table 4 shows performance of six polybutene samples against six controls when the coatings are applied with a 6.25 cm (2.5 in.) brush (94% lead dust suppression).

TABLE 4

ASTM E 1728-95 RESULTS FROM POLYBUTENE MICROCAPSULES APPLIED WITH A BRUSH

| CODE | μcapsule Type | Pb level |
|---|---|---|
| Ba1 | Poly 1 | 8.5 |
| Ba2 | Poly 2 | 2.5 |
| Ba3 | Poly 3 | 2.5 |
| Ba4 | Poly 4 | 2.5 |
| Ba5 | Poly 5 | 2.5 |

TABLE 4-continued

ASTM E 1728-95 RESULTS FROM POLYBUTENE MICROCAPSULES APPLIED WITH A BRUSH

| CODE | μcapsule Type | Pb level |
|---|---|---|
| Ba6 | Poly 6 | 2.5 |
| | AVG = | 3.5 |
| | Stan. Dev. | 5 |
| Ca1 | Control 1a | 5.5 |
| Ca2 | Control 2a | 49 |
| Ca3 | Control 3a | 25 |
| Ca4 | Control 4a | 199 |
| Ca5 | Control 5a | 42 |
| Ca6 | Control 6a | 93 |
| | AVG = | 68.91667 |
| | Stan. Dev. | 130.0833 |

Using a drawdown device, the most effective lead suppression mixture was a 50:50 mixture of the highest performing microcapsules 104; polybutene and Ca(OH)$_2$. Tables 5 and 6 show the performance of six samples of the mixture against six samples of the controls (52% lead dust suppression and 62% lead dust suppression, respectively). In both sets of samples 100, the mean for the microcapsule samples 100 is less than half of the controls.

TABLE 5

ASTM E 1728-95 RESULTS FROM SET 1: 50:50 COMBINATION OF Ca(OH)$_2$ AND POLYBUTENE USING A DRAWDOWN DEVICE

| CODE | μcapsule Type | Pb level |
|---|---|---|
| D1 | mix 1 | 14 |
| D2 | mix 2 | 14 |
| D3 | mix 3 | 16 |
| D4 | mix 4 | 15 |
| D5 | mix 5 | 19 |
| D6 | mix 6 | 12 |
| | AVG = | 15 |
| | Stan. Dev. | 2.366432 |
| C1 | Control-1 | 25 |
| C2 | Control-2 | 39 |
| C3 | Control-3 | 40 |
| C4 | Control-4 | 19 |
| C5 | Control-5 | 24 |
| C6 | Control-6 | 43 |
| | AVG = | 31.66667 |
| | Stan. Dev. | 10.15218 |

TABLE 6

ASTM E 1728-95 RESULTS FROM SET 2: 50:50 COMBINATION OF Ca(OH)$_2$ AND POLYBUTENE USING A DRAWDOWN DEVICE Set 2

| CODE | μcapsule Type | Pb level |
|---|---|---|
| Db1 | mix 1a | 10 |
| Db2 | mix 2a | 11 |
| Db3 | mix 3a | 13 |
| Db4 | mix 4a | 12 |
| Db5 | mix 5a | 12 |
| Db6 | mix 6a | 16 |
| | AVG = | 12.33333 |
| | Stan. Dev. | 2.065591 |
| Cb1 | Control-1 | 34 |
| Cb2 | Control-2 | 42 |
| Cb3 | Control-3 | 21 |
| Cb4 | Control-4 | 35 |
| Cb5 | Control-5 | 34 |
| Cb6 | Control-6 | 29 |

TABLE 6-continued

ASTM E 1728-95 RESULTS FROM SET 2: 50:50 COMBINATION OF Ca(OH)$_2$ AND POLYBUTENE USING A DRAWDOWN DEVICE Set 2

| CODE | μcapsule Type | Pb level |
|---|---|---|
| | AVG = | 32.5 |
| | Stan. Dev. | 7.007139 |

As can be seen in Table 7, the mixture of microcapsules 104 (50% polybutene and 50% CaOH) was also very effective when applied by a 6.25 cm (2.5 in.) polyester brush (95% lead dust suppression). The six samples with the microcapsules 104 significantly decreased the amount of lead dust on the surface as compared to the six control samples of latex paint only.

TABLE 7

ASTM E 1728 RESULTS FROM 50:50 COMBINATION OF Ca(OH)$_2$ AND POLYBUTENE APPLIED WITH BRUSH.

| CODE | μcapsule Type | Pb level |
|---|---|---|
| Aa1 | Mix 1a | 2.5 |
| Aa2 | Mix 2a | 2.5 |
| Aa3 | Mix 3a | 2.5 |
| Aa4 | Mix 4a | 2.5 |
| Aa5 | Mix 5a | 2.5 |
| Aa6 | Mix 6a | 6 |
| | AVG = | 3.083333 |
| | Stan. Dev. | 2.916667 |
| Ca1 | Control 1a | 5.5 |
| Ca2 | Control 2a | 49 |
| Ca3 | Control 3a | 25 |
| Ca4 | Control 4a | 199 |
| Ca5 | Control 5a | 42 |
| Ca6 | Control 6a | 93 |
| | AVG = | 68.91667 |
| | Stan. Dev. | 130.0833 |

Figure 5:
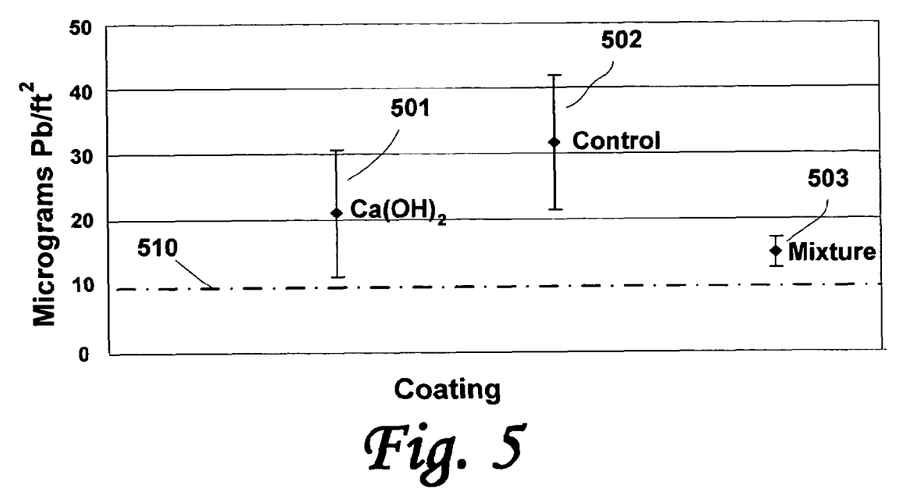
FIG. 5 depicts lead test wipe results in μg Pb/ft$^2$ for a first sample set, using ASTM E 1728, for two coatings incorporating microcapsules and a control coating with no microcapsules, all applied with a drawdown device.

FIG. 5 presents data of Tables 1 and 5 for a first set of microcapsule coatings containing Ca(OH)$_2$ (Table 1) and a mixture of Ca(OH)$_2$ and polybutene (Table 5) as applied with a drawdown device. On average, the Ca(OH)$_2$ 501 suppresses lead dust better than the Control 502 (no microcapsules) but the mixture 502 significantly improves the lead suppression bringing it almost to the 10 μg Pb/ft$^2$ level 510.

Figure 6:
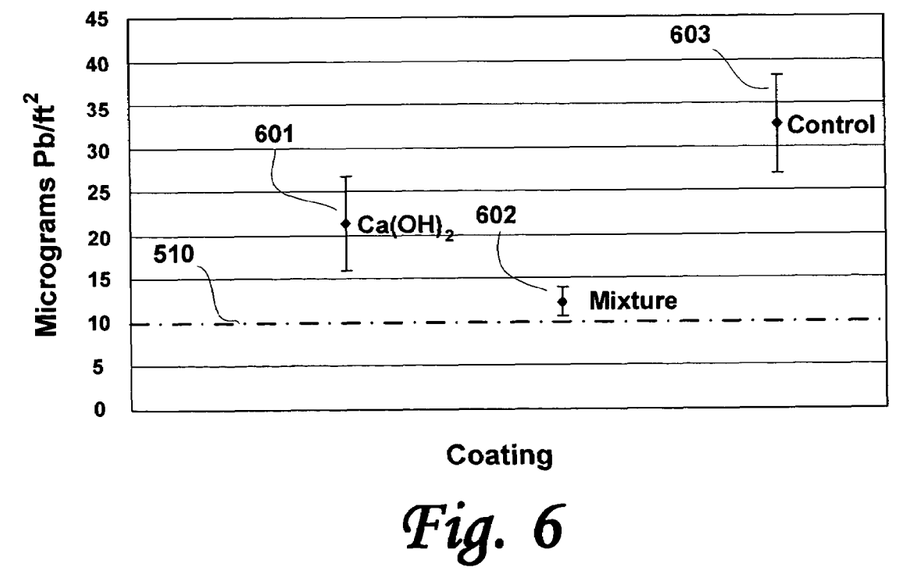
FIG. 6 depicts lead test wipe results in μg Pb/ft$^2$ for a second sample set, using ASTM E 1728, for two coatings incorporating microcapsules and a control coating with no microcapsules, all applied with a drawdown device.

FIG. 6 depicts data of Tables 2 and 6 for a second set of microcapsule coatings containing Ca(OH)$_2$ (Table 2) and a mixture of Ca(OH)$_2$ and polybutene (Table 6) as applied with a drawdown device. In every case the Ca(OH)$_2$ 601 suppresses lead dust better than the Control 603 (no microcapsules) but the mixture 602 significantly improves the lead suppression bringing it almost to the 10 μg Pb/ft$^2$ level 510.

Figure 7:
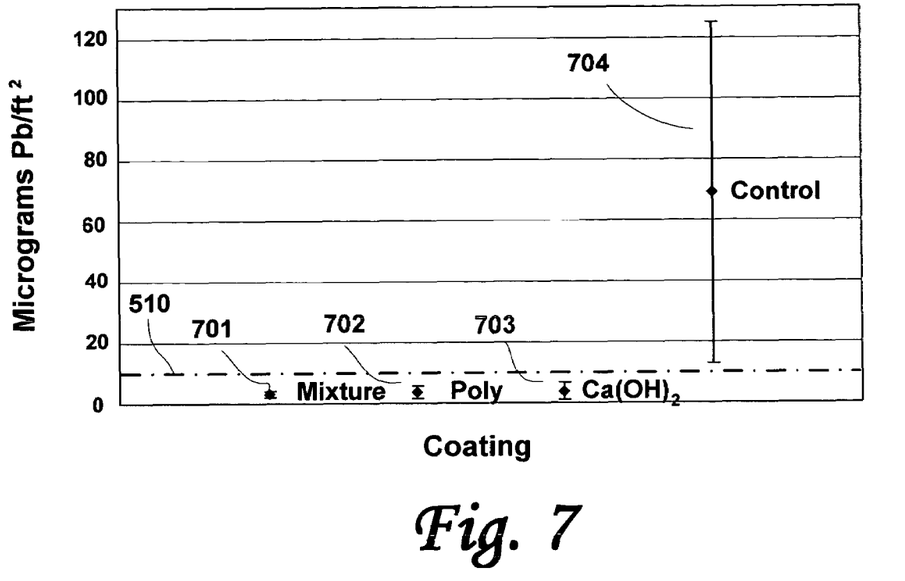
FIG. 7 depicts lead test wipe results in μg Pb/ft$^2$ for a third sample set, using ASTM E 1728, for three coatings incorporating microcapsules and a control coating with no microcapsules, all applied with a brush.

FIG. 7 depicts data of Tables 3, 4 and 7 for a sample set of microcapsule coatings 102 containing Ca(OH)$_2$ (Table 3), a sample set of microcapsule coatings 102 containing polybutene (Table 4) and a sample set of microcapsule coatings 102 containing a 50:50 mixture of Ca(OH)$_2$ and polybutene (Table 6), all as applied with a brush. In every case all the sample sets containing microcapsules 104 suppress lead dust better than the Control 704 (no microcapsules) with all three, the mixture 701, the polybutene 702 and the Ca(OH)$_2$ significantly improving lead dust suppression, bringing it well below the 10 μg Pb/ft$^2$ level 510.

Figure 8:
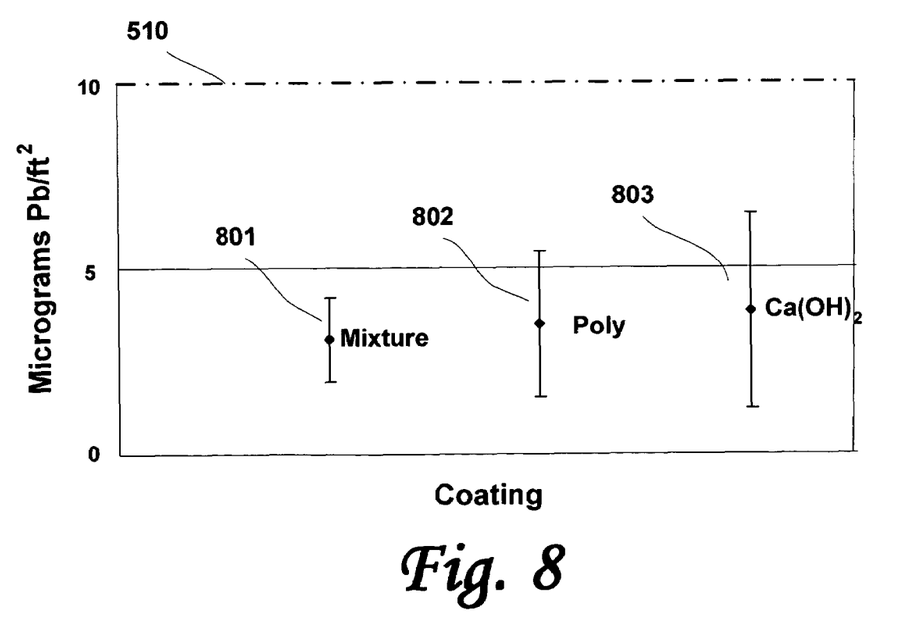
FIG. 8 depicts results shown in FIG. 7 in an expanded scale for illustrative comparison for only the three coatings incorporating microcapsules.

FIG. 8 depicts the three ranges 701, 702, 703 of FIG. 7 on an expanded scale so that the performance of the microcapsule 104 with a mixture 801 is seen to take dust suppression to a level below 5 µg Pb/ft² for all samples 100 while microcapsules 104 with polybutene 802 perform almost as well, having a slightly higher mean and standard deviation. The samples with microcapsules 104 of Ca(OH)₂ 803 had a mean below 5 µg Pb/ft², but a larger mean and standard deviation than the other two.

Field tests of a "mixture" self-healing paint (i.e., A-100 paint with a 50:50 mixture of Ca(OH)₂ and polybutene microcapsules 104 added in a 80 paint: 20 microcapsule weight ratio as described above) were initiated for exterior and interior lead-based painted walls at buildings in Monterey, Calif. The lead check screening procedure described above was used to qualitatively verify the presence of lead in the existing paint. The exterior test surface was wooden siding. A 9-m² test area was cleaned to remove loose chalk using a solution of sodium sesqui-carbonate and sodium meta-silicate in water. The cleaner was applied and the surface was scrubbed using a non-woven abrasive pad. The surface was thoroughly rinsed with clean water and then allowed to dry.

The "mixture" self-healing paint was then applied by brush to half (4.5 m²) of the exterior test area. The other half (4.5 m²) was coated with the same latex (A-100) paint without microcapsules 104. The coated areas were allowed to dry overnight and were then painted with a second (finish) coat of A-100 latex paint without microcapsules 104. The process was repeated for an interior test area of 9 m², except that the test area was not washed prior to coating. There were no application related defects and appearance was acceptable when applied by brush. However, there was increased drag on the brush and a subsequent greater degree of effort was needed to apply the self-healing paint compared to the same paint without microcapsules 104. It is probable that application could be improved by utilizing a specially formulated latex base with lower solids content in the paint itself.

After an eight-hour cure, each of the self-healing and control coatings were scribed and subjected to ASTM E 1728-95 wipe tests to evaluate the short-term self-healing properties of the self-healing coating. Wipe tests were performed on six 100 by 100 cm (40 in. by 40 in.) test areas each with eight 100 cm (40 in.) long scribes through the coating to the substrate, as was done in the laboratory experiments. Wipe test samples were taken 20 minutes after the scribes were cut. Individual wipe test kits were used for each test area to avoid cross contamination.

All of the post-scribe wipe tests on the six interior self-healing coatings returned lead concentrations below the performance criterion of 50 µg Pb/ft². However, two of six controls had detectable lead levels. Three of the six wipe tests in the control area of the exterior paint had detectable lead levels, all of which exceeded the performance criterion of 50 µg Pb/ft². Three of the six wipe tests on the self-healing exterior coatings also had detectable lead levels, all of which were above the performance criterion of 50 µg Pb/ft².

The average wipe test lead level for interior surfaces with self-healing coating was 45 µg Pb/ft², or the same as the ASTM E 1728-95 method detection limit. Tests on control interior surfaces were only slightly higher with an average of 60 µg Pb/ft². The tests on interior surfaces show a 25% improvement in performance for the self-healing coating over the control.

The average wipe test lead level for exterior surfaces with self-healing coating was 140 µg Pb/ft². Tests on control exterior surfaces were significantly higher with an average of 1300 µg Pb/ft². The tests on exterior surfaces demonstrate the short-term efficacy of the self-healing coating, i.e., an 89% improvement in performance over control.

The generally accepted maximum life of "commercially available" latex paint is ten years on exterior surfaces with the major degradation caused by the ultraviolet light (UV) component of sunlight. On interior coatings, the maximum service life is four years in child-occupied facilities, due to wear and tear by young children. Thus, based on the above lead wipe test results, the use of self-healing coatings is projected to extend the coating lives by approximately 4.2-6 years for exterior coatings and by approximately 2.4 years for interior coatings used in areas frequented by young children, such as a day care facility.

Thus, in general, a self-healing coating is provided that, after application and curing upon a substrate 110, self heals upon its physical compromise. It comprises one or more solvents, one or more solids and microcapsules containing a repair material that may comprise one or more substances. The shell of the microcapsule 104 is resistant to degradation from within by the repair substances. Prior to application of the self-healing coating and after addition of the microcapsules 104 to a solvent/solid mixture, the microcapsules 104 are resistant to short term degradation of the exterior shell by either the solvents or the solids. The microcapsules 104 burst upon physical compromise of the resultant applied and cured coating, releasing the repair substances to seal a volume (void) within the coating cause by the physical compromise. Spherical microcapsules 104 produce a most efficient delivery volume and are preferred. However, other shapes, such as filaments, may be used also, with a concomitant loss of efficiency. In addition to traditional paints, the microcapsules 104 may be used with, or deliver, greases, lubricants, varnishes, lacquers, shellacs, polyurethanes, waxes, polishes, fabric treatments, waterproofing compounds, liquid roofing coatings, oils, and similar compounds.

The combination of one or more solvents and one or more solids may comprise a protective coating that would serve the purpose of protecting a substrate but not have the self-healing properties of the present invention. This protective coating may be one of a number of commercially available products, to include primer paints, topcoat paints, "one coat" or "self-priming" paints, varnishes, lacquers, polyurethane finishes, shellacs, waxes, polishes, "one step" finishing preparations for wood, metal, or synthetic materials, and combinations thereof. The paint primers may be: polyurethanes, oil-based enamels, enamel undercoater, latex acrylics, acrylic formulations and epoxy formulations. Further, topcoat and self-priming paints may be: polyurethanes, oil-based enamels, enamels, latex acrylics, acrylic formulations and epoxy formulations.

Also provided as an embodiment of the present invention is a microcapsule 104 suitable for adding to available protective coatings to facilitate self-healing thereof after application and curing. In general, this microcapsule 104 comprises a repair substance and a shell enclosing a volume containing the repair substance. Upon application of the protective coating to a substrate and curing of the coating thereon, physical damage to the resultant coating ruptures the shell of the microcapsules 104 in the vicinity of the rupture and deploys the repair substance into a volume (void) within the coating caused by the physical damage.

The shell of the microcapsule 104 may be a sphere with an outer diameter preferably within the approximate range of 50 to 200µ. More preferably, the shell is a sphere with an outer diameter of approximately 60-150µ. The shell of the microcapsule may comprise either gelatin or, more preferably, urea formaldehyde (UF).

The substances within the microcapsules 104 may be a combination of film-forming compounds and dust suppression compounds. These compounds may be any of: polybutenes, $Ca(OH)_2$, long chain polyester diluents, carrier diluents, and combinations thereof.

The microcapsules 104 are added prior to application as a pre-specified percentage of the weight of the base coating at a pre-specified time prior to application of the self-healing coating. Preferably, the pre-specified percentage lies in the approximate range of 10 to 30% and the microcapsules are added within fourteen (14) days of application. Most preferably, the pre-specified percentage is approximately 20% and the microcapsules are added when preparing the coating for application.

Also provided is a method for making a self-healing coating. It comprises: (a) providing a non-self healing coating; (b) providing microcapsules filled with a repair substance compatible with the non-self healing coating; and (c) mixing the microcapsules into the non-self healing coating such that the microcapsules are fully wetted and interspersed evenly throughout the non-self healing coating.

Further provided is a method for producing a self-healing coating upon a substrate. It comprises: (a) providing a non-self healing coating; (b) providing microcapsules filled with a repair substance compatible with the non-self healing coating; (c) mixing the microcapsules into the non-self healing coating such that the microcapsules are fully wetted and interspersed evenly throughout the non-self healing coating; (d) applying the self-healing coating to the substrate by any of a number of means selected from the group consisting of: brushing, rolling, drawing down, and combinations thereof; and (e) permitting the applied self-healing coating to cure prior to use of the substrate.

While the invention has been described in terms of its preferred embodiments, those skilled in the art will recognize that the invention may be practiced with modifications within the spirit and scope of the appended claims. For example, although the system is described in specific examples for paints, it is amenable for use with other coatings that one desires to prolong in an uncompromised state or to retain an original capacity for protection, regardless of outward appearance. These coatings may include merely decorative coatings as well as the aforementioned lead dust suppression coatings. Thus, it is intended that all matter contained in the foregoing description or shown in the accompanying drawings shall be interpreted as illustrative rather than limiting, and the invention should be defined only in accordance with the following claims and their equivalents.

The abstract is provided to comply with the rules requiring an abstract, which will allow a searcher to quickly ascertain the subject matter of the technical disclosure of any patent issued from this disclosure. 37 CFR § 1.72(b). Any advantages and benefits described may not apply to all embodiments of the invention.

We claim:

1. A self-healing coating applied to an aged coating containing lead for suppression of dust from said aged coating, comprising:
   a liquid COTS coating for application over said aged coatings; and
   microcapsules, having a shell defining a volume of a sphere with an outer diameter in the approximate range of 100-200 microns, said microcapsules wet mixed into said liquid COTS coating just prior to application of said self-healing coating, said volume containing at least one substance used for said suppression of dust generated from the compromise of said self-healing coating after application thereof to said aged,
   wherein said shell is resistant to degradation by said substance; and
   wherein prior to application of said self-healing coating and after addition of said microcapsules to said COTS coating for application over said aged coating, said microcapsules are resistant to short term degradation by said COTS coating, and
   wherein said microcapsules burst upon physical compromise of said applied and cured self-healing coating, releasing said substance to suppress said dust.

2. The self-healing coating of claim 1 in which said liquid COTS coating comprises a protective coating.

3. The self-healing coating of claim 2 in which said protective coating is a paint.

4. The self-healing coating of claim 3 in which said paint is a primer selected from the group consisting of: polyurethanes, oil-based enamels, enamel undercoaters, latex acrylics, acrylic formulations and epoxy formulations.

5. The self-healing coating of claim 3 in which said paint is a topcoat paint selected from the group consisting of: polyurethanes, oil-based enamels, enamels, latex acrylics, acrylic formulations and epoxy formulations.

6. The self-healing coating of claim 3 in which said paint is a self-priming paint selected from the group consisting of: polyurethanes, oil-based enamels, enamels, latex acrylics, acrylic formulations and epoxy formulations.

7. The self-healing coating of claim 1 in which said liquid COTS coating comprises a decorative coating.

8. The self-healing coating of claim 1 in which said shell has an outer diameter within the approximate range of 150 to 200 microns.

9. The self-healing coating of claim 1 in which said shell comprises urea formaldehyde (UF).

10. The self-healing coating of claim 1 in which said shell comprises gelatin.

11. The self-healing coating of claim 1 in which said substance comprises materials selected from the group consisting of: film-forming compounds, dust suppression compounds, diluents, and combinations thereof.

12. The self-healing coating of claim 11 in which said film-forming compounds are selected from the group consisting of polybutene, $Ca(OH)_2$, and combinations thereof.

13. The self-healing coating of claim 11 in which said diluents are selected from the group consisting of: long chain polyester diluents, carrier diluents, water, and combinations thereof.

14. The self-healing coating of claim 11 in which said dust suppression compounds are selected from the group consisting of: $Ca(OH)_2$, polybutene, and combinations thereof.

15. The self-healing coating of claim 1 in which said microcapsules comprise a pre-specified percentage of the weight of said non-self healing coating, wherein said microcapsules are added at a pre-specified time prior to application of said self-healing coating.

16. The self-healing coating of claim 15 in which said pre-specified percentage lies in the approximate range of 10 to 40% by weight and said pre-specified time is within about fourteen (14) days prior to application of said self-healing coating.

17. The self-healing coating of claim 15 in which said pre-specified percentage is approximately 20% by weight and said pre-specified time is approximately concurrent with preparing said self-healing coating for application.

18. A microcapsule for adding to a liquid COTS protective coating to be cured at ambient temperature to facilitate self-healing of said resultant coating after curing thereof, said self-healing further suppressing dust dispersion from an existing aged coating, said microcapsule comprising:
- a substance suitable for said suppressing of dust dispersion; and
- a shell in the approximate range of 100-200 microns in diameter enclosing a volume containing said substance, whereupon application of said resultant self-healing coating over said aged coating and curing of said self-healing coating thereon, physical compromise of said self-healing coating results in rupture of said shell and deployment of said substance to suppress said dust present in an area around said microcapsule.

19. The microcapsule of claim 18 in which said shell is a sphere with an outer diameter within the approximate range of 150 to 200 microns.

20. The microcapsule of claim 18 in which said shell is a sphere with an outer diameter of approximately 150 microns.

21. The microcapsule of claim 18 in which said shell comprises urea formaldehyde (UF).

22. The microcapsule of claim 18 in which said shell comprises gelatin.

23. The microcapsule of claim 18 in which said substance comprises materials selected from the group consisting of: film-forming compounds, dust suppression compounds, diluents, and combinations thereof.

24. The microcapsule of claim 23 in which said film-forming compounds are selected from the group consisting of: polybutene, $Ca(OH)_2$, and combinations thereof.

25. The microcapsule of claim 23 in which said diluents are selected from the group consisting of: long chain polyester diluents, carrier diluents, water, and combinations thereof.

26. The microcapsule of claim 23 in which said dust suppression compounds are selected from the group consisting of: $Ca(OH)_2$, polybutene, and combinations thereof.

* * * * *